(No Model.)
J. EDGE.
MOLE TRAP.
No. 260,348. Patented June 27, 1882.
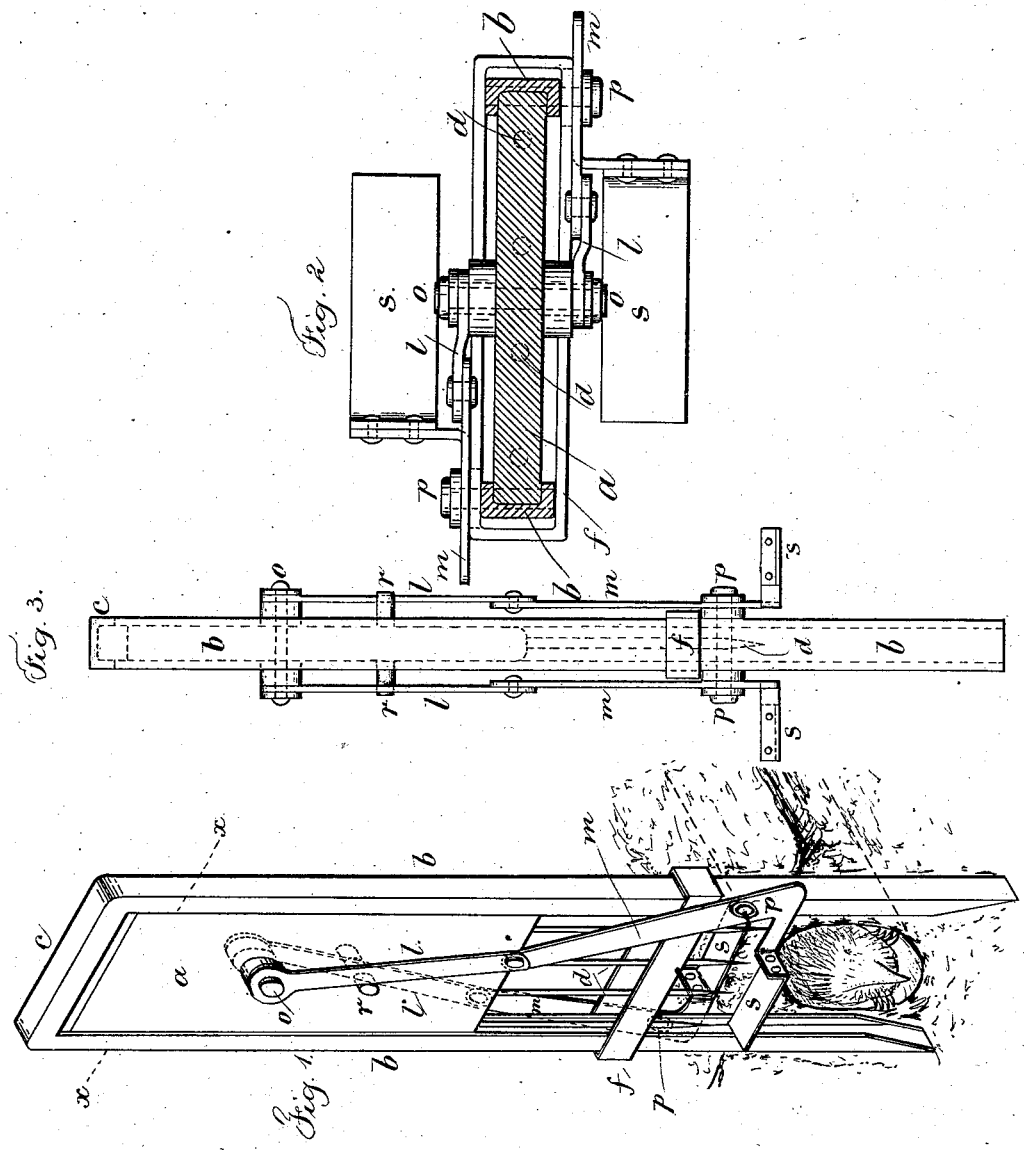
Witnesses:
J. Hail
Chas. H. Smith
Inventor
James Edge
per Lemuel W. Serrell
atty

UNITED STATES PATENT OFFICE.

JAMES EDGE, OF PATERSON, NEW JERSEY.

MOLE-TRAP.

SPECIFICATION forming part of Letters Patent No. 260,348, dated June 27, 1882.

Application filed April 3, 1882. (No model.)

*To all whom it may concern:*

Be it known that I, JAMES EDGE, of Paterson, in the county of Passaic and State of New Jersey, have invented an Improvement in Mole-Traps, of which the following is a specification.

In my Patent No. 209,388 weights with spikes are shown, the same sliding in vertical supports, and the disengaging device being in the middle between the two spiked weights. Other mole-traps have been made with a crosshead with spikes that are unlatched when the mole is beneath the tripper resting on the earth.

My present invention is for simplifying the construction and for supporting the weight and spikes until the mole is directly beneath such spikes.

In the drawings, Figure 1 is a perspective view of the mole-trap as ready for use. Fig. 2 is a sectional plan at the line $x\,x$, and Fig. 3 is a side elevation.

The frame in which the weight $a$ slides is preferably made of grooved wrought-iron, the sides $b\,b$ and top $c$ being in one and notched and bent at the angles, and the lower ends of the side pieces, $b$, are sharpened to form penetrating-prongs that are thrust into the earth at each side of the mole-run, so that the weight $a$ occupies a transverse position above such run. The spikes $d$ are at the bottom of the weight $a$. They are pointed, and the weight $a$ is sufficiently heavy to drive the spikes into the earth. A spring, however, might be added, if desired.

The strap at $f$, passed around the side pieces, $b$, of the frame, serves to hold the parts in their proper relative position and to allow the spikes to descend between them.

The toggle-support for the weight and spikes is formed of a link, $l$, pivoted to the weight at $o$, and united by a joint to the upper end of the bent lever $m$. This lever $m$ is pivoted at $p$ to the frame $b$, and has a bearing-foot or tripper-piece at $s$, that rests upon the surface of the earth when the trap is in place.

It is usually preferable to duplicate the lever $m$, link $o$, and the tripper-piece $s$ at the opposite side of the weight and frame, so that when the trap is set a mole in passing along in either direction will raise the horizontal arm of one of the levers, then pass beneath the weight and spikes and raise the horizontal arm of the other lever, and by bending the toggles they cease to support the weight, and the weight causes them to turn into the position shown in Fig. 1. Said weight in falling drives the spikes or prongs into the ground and into the mole, he being directly beneath the spikes when the weight falls.

One set of toggle links and levers may be used, if desired; but the trap is more reliable if two sets, one at each side, are made use of.

The stop at $r$ limits the movement of the toggles when the trap is set.

I am aware that a mole-trap has been made with a weight, with two sets of prongs and an intermediate tripping device, but one set of prongs is liable to interfere with the penetration of the other set. I am also aware that a single set of spikes has been used with a jaw-trap.

I claim as my invention—

The combination, in a mole-trap, of a frame terminating at the lower end as prongs to enter the earth, a weight sliding in that frame, a single range of spikes upon the weight, a tripper, and toggle-link at each side of the frame and weight, substantially as set forth, whereby the trap is discharged when the second tripper is moved, substantially as specified.

Signed by me this 28th day of March, A. D. 1882.

JAMES EDGE.

Witnesses:
GEO. T. PINCKNEY,
WILLIAM G. MOTT.